United States Patent
Vichniakov et al.

(10) Patent No.: US 7,255,916 B2
(45) Date of Patent: Aug. 14, 2007

(54) METALLIC LAYER MATERIAL, REINFORCED WITH BASALT FIBERS, AS WELL AS PRODUCTS MADE THEREOF

(75) Inventors: Alexei Vichniakov, Bahrendorf (DE); Hans-Juergen Schmidt, Buxtehude (DE)

(73) Assignee: Airbus Deutschland GmbH, Hamburg (DE)

( * ) Notice: Subject to any disclaimer, the term of this patent is extended or adjusted under 35 U.S.C. 154(b) by 215 days.

(21) Appl. No.: 11/029,047

(22) Filed: Jan. 4, 2005

(65) Prior Publication Data

US 2006/0147690 A1 Jul. 6, 2006

(51) Int. Cl.
*B32B 15/04* (2006.01)
*B32B 27/04* (2006.01)
*B64C 1/00* (2006.01)

(52) U.S. Cl. .............................. 428/301.1; 428/301.4; 244/133

(58) Field of Classification Search ................ 442/233, 442/368, 378; 428/301.1, 301.4; 244/133
See application file for complete search history.

(56) References Cited

U.S. PATENT DOCUMENTS

| | | | | |
|---|---|---|---|---|
| 4,489,123 A | * | 12/1984 | Schijve et al. | 428/213 |
| 5,403,653 A | * | 4/1995 | Moreton et al. | 428/300.4 |
| 6,595,467 B2 | * | 7/2003 | Schmidt | 244/119 |
| 6,647,747 B1 | * | 11/2003 | Brik | 65/492 |
| 6,712,315 B2 | * | 3/2004 | Schmidt et al. | 244/117 R |
| 7,001,857 B2 | * | 2/2006 | Degroote | 442/136 |
| 7,100,871 B2 | * | 9/2006 | Assler et al. | 244/117 R |

FOREIGN PATENT DOCUMENTS

| | | |
|---|---|---|
| EP | 0 056 288 | 12/1984 |
| EP | 0 312 151 | 4/1989 |
| EP | 0 573 507 | 4/1995 |

OTHER PUBLICATIONS http://en.wikipedia.org/wiki/GLARE, Wikipedia, the free encyclopedia. Description of "Glare (Material)", date Jan. 4, 2005.

* cited by examiner

*Primary Examiner*—N. Edwards
(74) *Attorney, Agent, or Firm*—Christopher Paradies; Fowler White Boggs Banker P.A.

(57) ABSTRACT

A metallic layer material includes at least two metal sheets. Each sheet has a thickness of less than 1.5 mm. Between the sheets, a plastic layer is disposed, which is bonded to the metal sheets. The plastic layer comprises a plastic material and basalt fibers, and the basalt fibers have a modulus of elasticity exceeding 50 GPa. The basalt fibers may constitute 35-75% of the volume of the plastic layer. and may be comprised of 35-55 weight % of $SiO_2$, 10-25 weight % of $Al_2O_3$, and 3-10 weight % of MgO. In aerospace applications and other applications requiring good specific strength, stiffness and damage tolerance, the metal sheets may be made of a metal having a tensile strength exceeding 0.20 GPa.

18 Claims, 1 Drawing Sheet

Figure 1:
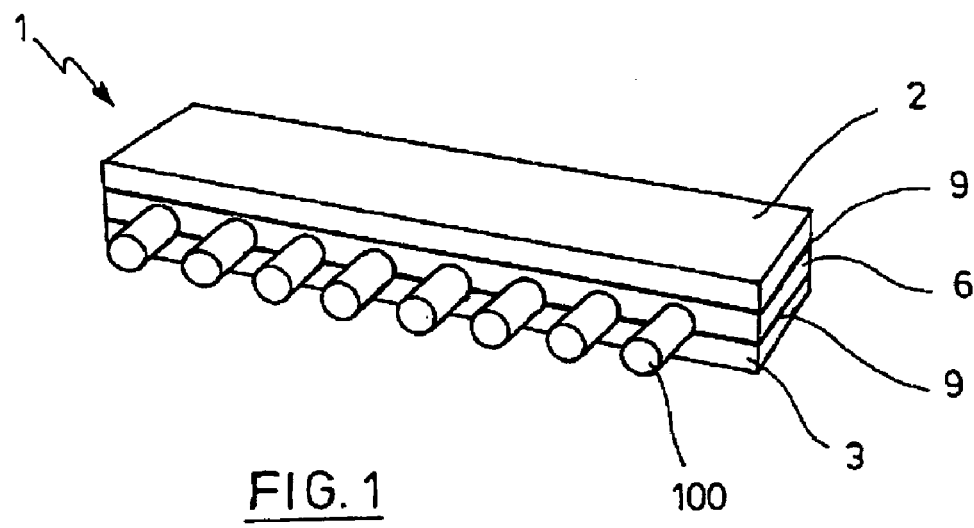

METALLIC LAYER MATERIAL, REINFORCED WITH BASALT FIBERS, AS WELL AS PRODUCTS MADE THEREOF

FIELD OF THE INVENTION

The present invention relates to layer materials or laminate materials. In particular, the present invention relates to a laminate and to a structural element of an aircraft.

BACKGROUND OF THE INVENTION

In the design of lightweight structures, particular emphasis is placed on weight reduction. In this context, depending on the application, the lightweight structures shall meet different requirements concerning strength, fatigue tolerance and damage tolerance. In particular in aircraft engineering, a particular emphasis is placed on the damage-tolerance characteristics of lightweight structures.

The increase of the damage-tolerance characteristics can take place in various ways: the increase of the skin thickness, the use of additional local stiffening elements or the adaptation of the thickness of the skin to load requirements, etc. These methods only result in an increase of the weight of the lightweight structure. The use of materials with increased damage-tolerance characteristics, such as metal layer material or fiber-reinforced laminates, for instance, is another option.

Recently, metal-based-reinforced composite materials have increased in importance. Reinforcing metal materials with fibers makes it possible to clearly increase the mechanical characteristics and the damage tolerance characteristics of metal materials. However, usually, the improvement of material characteristics is very closely linked to significantly higher costs for composite materials. This is due to increased production costs.

The methods connected with the melting-on of base metal materials are very time-consuming and expensive. From among suitable manufacturing methods which are relatively economical, the bonding of metal sheets with fibers bound in adhesive foil has proven reliable.

From EP 0 312 151, a laminate is known which consists of at least two metal sheets, wherein a plastic layer is disposed between the sheets, which plastic layer is bonded to the metal sheets and includes glass filaments. Such metal laminates are in particular suitable for lightweight structures for aircraft-related applications because these structures have advantageous mechanical characteristics while being of low structural weight.

From EP 0 056 288 a further metal laminate is known, wherein polymer fibers from the group of aramides, polyaromatic hydracids and aromatic polyesters in a plastic layer are used. From EP 0 573 507 an alloy laminate material is known which comprises reinforcement fibers, embedded in a plastic matrix, which fibers being from a group consisting of carbon fibers, polyaromatic amide fibers, aluminum oxide fibers, silicon carbide fibers or mixtures thereof.

The advantages of laminated materials consist of clearly higher damage tolerance characteristics compared to equivalent monolithic sheets. The crack propagation characteristics of fiber-reinforced metal laminates are 10 to 20 times better than those of monolithic sheets.

However, when compared to those of monolithic materials, the static characteristics of known laminated materials are inferior. Depending on the adhesive systems and fiber types used, the limit of elasticity during exposure to tensile, compressive or shearing stress of known laminated materials is 5 to 20% below that of equivalent monolithic materials.

SUMMARY OF THE INVENTION

An exemplary embodiment of the present invention relates to a laminate comprising metal sheets and a plastic layer, wherein a plastic layer is arranged between the sheets, which plastic layer is bonded or glued to the metal sheets, wherein the layer comprises basalt fibers with a modulus of elasticity exceeding 50 GPa. Herein, "fibers" is meant to include filaments and all other elongated fiber-like or filament-like forms, specifically excluding isotropic particles that are not fiber-like. Filaments may be continuous or discontinuous across or along a metallic layer material. Also, each metal sheet may have a thickness of less than 1.5 mm, for example. More preferably, the metal sheets have a thickness in a range of 0.1 to 0.8 mm, which may provide a lower specific weight.

Herein, a plastic layer means any layer made, at least in part, of a plastic material, which includes any of the polymeric materials, such as a thermoplastic, material, Duroplast, thermosetting material, or otherwise curable material, such as an epoxy or epoxy-resin material.

According to one embodiment, the basalt fibers may be substantially aligned parallel to each other in at least one direction. Although ideally "parallel" means that the fibers would never cross one another, substantially aligned parallel means that the fibers have an alignment in one preferred direction, such that anisotropic properties are imparted to the plastic layer. More preferably, there is negligible crossing of one fiber over its next nearest neighbour. Even more preferably, the fibers do not overlap each other. Furthermore, the basalt fibers or filaments may constitute 35-75% of the combined volume of the plastic material and the basalt fibers together (35-75 vol %).

According to further exemplary embodiments,

A. the basalt fibers may have a modulus of elasticity of 90-120 GPa;

B. the basalt fibers may comprise 35-55 weight % (or wt %), preferably 47-50 weight %, of $SiO_2$;

C. the basalt fibers may comprise 10-25 weight %, preferably 15-18 weight %, of $Al_2O_3$;

D. the basalt fibers may comprise 3-10 weight %, preferably 5-7 weight %, of MgO; and/or;

E. the metal sheets may consist of or may include a material with a tensile strength exceeding 0.20 GPa.

It is believed that these exemplary embodiments of the present invention allow for improved mechanical and damage tolerance characteristics of laminated layer materials.

Furthermore, such laminate material or product may have improved mechanical and damage tolerance characteristics of laminated materials. When compared to known fiber-reinforced laminates, such as glass-reinforced fiber metal laminate (GLARE), better static characteristics are expected with the use of basalt fibers.

Furthermore, it is believed that manufacturing costs may be reduced. The manufacture of basalt fibers is based on natural stones or rock. Here, raw material costs may be lower than in the case of glass fibers.

SHORT-DESCRIPTION OF DRAWINGS

The drawings show exemplary embodiments of the invention, which embodiments are described in more detail below with reference to FIGS. 1 and 2. In the figures, identical components are designated by identical reference signs.

Figure 2:
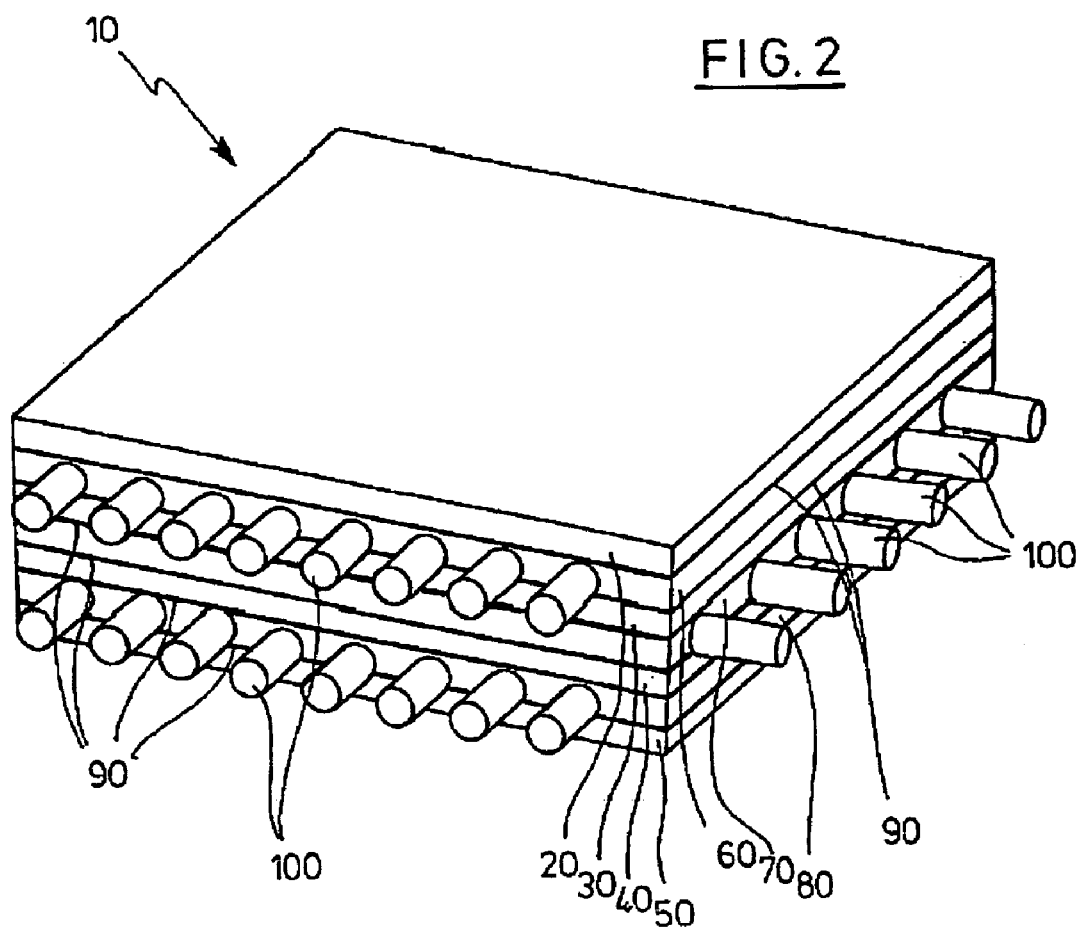

FIG. 1 is a schematic representation of a layer constitution of a layer material according to a first exemplary embodiment; and FIG. 2 is a schematic representation of a layer constitution of a layer material according to a second exemplary embodiment.

DETAILED DESCRIPTION OF EXEMPLARY EMBODIMENTS

The figures show metal-based fiber-reinforced composite materials. Exemplary embodiments of the present invention relate to laminating of metal sheets with a plastic layer comprising basalt fibers, which layer is bonded (or glued or attached) to the metal sheets. The laminate 1 or 10 comprises at least two metal sheets 2 and 3 (FIG. 1) or 20, 30, 40, 50 (FIG. 2), wherein the thickness of each metal sheet is less than 1.5 mm, in particular ranging from 0.1 to 0.8 mm. Between the sheets 2 and 3 (FIG. 1) or 20, 30, 40, 50 (FIG. 2), at least one plastic layer 6 (FIG. 1) or 60, 70, 80 (FIG. 2) is arranged. Adhesive connections 9 or 90 may bond the plastic layers 6 (FIG. 1) or 60, 70, 80 (FIG. 2) to the metal sheets 2 and 3 (FIG. 1) or 20, 30, 40, 50 (FIG. 2). The plastic layers 6 (FIG. 1) or 60, 70, 80 (FIG. 2) comprise basalt fibers 100 with a modulus of elasticity exceeding 50 GPa, which basalt fibers are parallel to each other in at least one direction, wherein the basalt fibers form 35-75 vol % of the combined volume of the plastic and the basalt fibers together.

FIG. 1 schematically shows a plastic matrix with a parallel arrangement of basalt fibers 100 in the plastic layer 6. It is understood that the schematic illustration of FIGS. 1 and 2 are idealized for simplicity. In actual plastic layers 6 or 60, 70, 80, the basalt fibers may be substantially aligned in parallel without achieving the ideal of parallelism In FIG. 2, three plastic layers 60, 70, 80 are arranged between the metal sheets 20, 30, 40, 50, wherein the alignment of the basalt fibers 100 in a plastic layer 60 is parallel, whereas the orientation of the basalt fibers 100 in the layers 70 and 80, which are displaced below the plastic layer 60, is rotated in relation to the layer located above. FIG. 2 shows one preferred embodiment having a rotation of 90° from one layer to the next; however, any rotation may be selected depending on the number of layers and the applicable states of stress and strain that the laminate is designed to accommodate. Preferably, the number of metal sheets ranges from 2 to 20. In FIGS. 1 and 2, the thickness of the various layers is shown schematically. The thickness of the plastic layer 6 or layers 60, 70, 80 may be thinner, the same, or thicker than the metal layers 2, 3 or 20, 30, 40, 50, depending on the proposed use for the laminate material. In one embodiment, the plastic layer 6 or layers 60, 70, 80 are thinner than the metal layers 2, 3 or 20, 30, 40, 50 between which the plastic layer 6 or layers 60, 70, 80 are disposed.

By using the type of fiber of an exemplary embodiment of this invention, an improvement in the static characteristics may be achieved.

The use of basalt fibers as a reinforcement material for laminated materials has not hitherto been known. A natural stone in the form of basalt, granite, diabase (greenstone), amphibolite, diorite, trachyte, basalt, porphyry and obsidian can be used for the production of basalt fibers. Some suitable chemical compositions are shown in Table 1:

TABLE 1

| Chemical composition of basalt fibers | | |
|---|---|---|
| Component | Weight % | Preferred weight % |
| $SiO_2$ | 35-55 | 47-50 |
| $TiO_2$ | 0-5 | 1-2 |
| $Al_2O_3$ | 10-25 | 15-18 |
| $Fe_2O_3$, FeO | 7-20 | 11-14 |
| MgO | 3-10 | 5-7 |
| CaO | 5-20 | 6-12 |
| $N_2O$ | 0-5 | 2-3 |
| $K_2O$ | 0-10 | 2-7 |

The advantages of basalt fibers includes a high modulus of elasticity of 90-120 GPa, a large operating temperature range of −260 to +650° C., good characteristics during changing temperatures, good corrosion resistance as well as very good vibration resistance. (Table 2). This may render the application of bonded aluminum laminates with basalt fibers particularly relevant to aircraft construction. For example, it is believed to be particularly advantageous to form structural components of an aircraft body with the use of the laminate. For example, the laminate can be used as skin panel of an aircraft body. The use for skin panels of an aircraft wing is a further application. The laminate can also be used as a material of a stiffening element, preferably a stringer, in a structural component of an aircraft. In addition, the laminate has other properties. In one example, the laminate has a component element having an elongation at rupture in a range from 2% to 5%. For example, the elongation at rupture may be imparted by a substantial number of the basalt filaments in the laminate. In one example, the laminate includes basalt fibers having an elongation at rupture in a range from 2-5%.

TABLE 2

Mechanical characteristics of various fiber types in comparison to basalt fiber

| | Characteristics | | | | | | |
|---|---|---|---|---|---|---|---|
| | Basalt | E-glass | Silicon | Ceramics | Steel | Carbon | Aramide |
| Application temperature, ° C. | −260 ... +700 | −60 ... +460 | ... +1050 | ... +1200 | ... +600 | ... +2000 | ... +250 |
| Melting temperature, ° C. | 1450 | 1120 | 2000 | 1760 | 1400 ... 1600 | ... 2500 | 370 ... 500 |
| Density, kg/m³ | 2.60 ... 2.80 | 2.52 ... 2.63 | 2.00 ... 2.73 | 2.55 | 7.90 | 1.67 ... 2.15 | 1.38 ... 1.44 |
| Modulus of elasticity, GPa | 91 ... 110 | 73 | 60 ... 72 | 110 ... 125 | 176 ... 196 | 160 ... 830 | 58 ... 120 |

When positioning basalt fibers in the plastic matrix, the basalt fibers may be substantially aligned parallel to each other in at least one direction. Alternatively, the basalt fibers may be interwoven in the form of woven fabrics or interdispersed in a fiber mat.

As metal sheets, metals can be selected from the following group of materials: aluminum alloys, in particular aluminum-copper alloys such as those of the type M(USA) Nr. 2024, or aluminum-zinc alloys such as those of the type M(USA) Nr. 7075, aluminum-lithium alloys with a lithium content of 0.5 to 3%, steel, titanium alloys, copper, copper alloys, and magnesium alloys, for example.

It has to be noted that the present invention also relates to the use of a laminate according to an exemplary embodiment of the present invention in an aircraft. In particular, such laminates or composite materials according to exemplary embodiments of the present invention may be used for stringers, frames or skin panels in wings, fuselage, HTP and VTP. However, it should be noted that the use and application of the present invention is not limited to the use in conjunction with aircrafts, but may also be used in other applications such as cars, bikes, shells for mobile phones etc.

What is claimed is:

1. A laminate, comprising:
    at least two metal sheets, each having a thickness of less than 1.5 mm;
    a plastic layer disposed between the at least two metal sheets;
    wherein the plastic layer is bonded to the at least two metal sheets;
    wherein the plastic layer comprises a plastic material and basalt fibers;
    wherein the basalt fibers constitute 35-75% of a combined volume of the plastic material of the plastic layer and the basalt fibers together;
    wherein the basalt fibers have a modulus of elasticity of 90-120 GPa;
    wherein the basalt fibers include 35-55 weight % of $SiO_2$;
    wherein the basalt fibers include 10-25 weight % of $Al_2O_3$;
    wherein the basalt fibers include 3-10 weight % MgO ; and
    wherein the at least two metal sheets include a material with a tensile strength exceeding 0.20 GPa.

2. The laminate of claim 1, wherein
    the basalt fibers are substantially aligned parallel to each other in at least one direction or interwoven in the form of woven fabric.

3. The laminate of claim 1, wherein
    the laminate includes the basalt fibers having an elongation at rupture in a range from 2-5%.

4. The laminate of claim 1, wherein
    the at least two metal sheets comprise a number of metal sheets ranging from 2 to 20.

5. The laminate of claim 1, wherein
    the plastic layer has a layer thickness and the layer thickness of the plastic layer is less than the thickness of each of the at least two metal sheets between which the plastic layer is disposed.

6. The laminate of claim 1, wherein:
    the plastic material is of a duroplastic material.

7. The laminate of claim 1, wherein
    the plastic material is a thermoplastic material.

8. The laminate of claim 1, wherein
    the at least two metal sheets are comprised of a metal selected from the group of metals consisting of aluminum alloy, aluminum-copper alloy, aluminum-copper alloy of the type M(USA) Nr. 2024, aluminum-zinc alloy, aluminum-zinc alloy of the type M(USA) Nr. 7075, aluminum-lithium alloy, aluminum-lithium alloy with a lithium content of 0.5 to 3%, steel, titanium alloy, copper, copper alloy, magnesium alloy and combinations thereof.

9. The laminate of claim 1, wherein
    the basalt fibers include 47-50 weight % of $SiO_2$;
    the basalt fibers include 15-18 weight % of $Al_2O_3$; and
    the basalt fibers include 5-7 weight % of MgO.

10. Structural element for an aircraft, comprising:
    at least two metal sheets, each having a thickness of less than 1.5 mm;
    a plastic layer disposed between the at least two metal sheets;
    wherein the plastic layer is bonded to the at least two metal sheets;
    wherein the plastic layer comprises a plastic material and basalt fibers,
    wherein the basalt fibers constitute 35-75% of a combined volume of the plastic material of the plastic layer and the basalt fibers together;
    wherein the basalt fibers have a modulus of elasticity of 90-120 GPa;
    wherein the basalt fibers include 35-55 weight % of $SiO_2$;
    wherein the basalt fibers include 10-25 weight % of $Al_2O_3$;
    wherein the basalt fibers include 3-10 weight % MgO; and
    wherein the at least two metal sheets include a material with a tensile strength exceeding 0.20 GPa.

11. The structural element of claim 10, wherein the structural element is a skin panel for a fuselage of the aircraft or a skin panel of an aircraft wing.

12. The structural element of claim 10, wherein the structural element is a stiffening element in a structural component of the aircraft.

13. The structural element of claim 12, wherein the stiffening element is a stringer or a frame.

14. The structural element of claim 10, wherein at least a portion of the fibers are continuous filaments.

15. The structural element of claim 14, wherein the continuous filaments are substantially aligned parallel, such that the continuous filaments do not overlap each other.

16. The structural element of claim 14, wherein the continuous filaments are interwoven.

17. The structural element of claim 10, wherein the fibers are substantially aligned parallel.

18. The structural element of claim 10, wherein the fibers are interwoven.

* * * * *